United States Patent
Waardenburg

(10) Patent No.: US 11,180,046 B2
(45) Date of Patent: Nov. 23, 2021

(54) USING ELECTRIC VEHICLES FOR LONG TERM ENERGY STORAGE

(71) Applicant: Alexander Frank Waardenburg, Mechanicsburg, PA (US)

(72) Inventor: Alexander Frank Waardenburg, Mechanicsburg, PA (US)

(73) Assignee: Alexander Waardenburg, Mechanicsburg, PA (US)

( * ) Notice: Subject to any disclaimer, the term of this patent is extended or adjusted under 35 U.S.C. 154(b) by 68 days.

(21) Appl. No.: 16/792,285

(22) Filed: Feb. 16, 2020

(65) Prior Publication Data

US 2020/0307405 A1    Oct. 1, 2020

Related U.S. Application Data

(60) Provisional application No. 62/824,349, filed on Mar. 27, 2019.

(51) Int. Cl.
| B60L 53/64 | (2019.01) |
| B60L 53/66 | (2019.01) |
| B60L 53/52 | (2019.01) |
| B60L 53/51 | (2019.01) |
| B60L 53/63 | (2019.01) |

(52) U.S. Cl.
CPC ............ *B60L 53/64* (2019.02); *B60L 53/51* (2019.02); *B60L 53/52* (2019.02); *B60L 53/63* (2019.02); *B60L 53/665* (2019.02)

(58) Field of Classification Search
CPC ..................................................... B60L 53/64
USPC ............................................................ 320/109
See application file for complete search history.

(56) References Cited

U.S. PATENT DOCUMENTS

| 10,857,900 | B2* | 12/2020 | Uyeki | B60L 58/12 |
| 2015/0137752 | A1* | 5/2015 | Shinzaki | H02J 3/322 |
| | | | | 320/109 |
| 2015/0329003 | A1* | 11/2015 | Li | B60L 53/66 |
| | | | | 320/134 |
| 2018/0143258 | A1* | 5/2018 | Kim | G01R 31/382 |
| 2019/0039467 | A1* | 2/2019 | Hortop | B60L 53/64 |
| 2020/0094691 | A1* | 3/2020 | Vidhi | G06Q 20/145 |

* cited by examiner

*Primary Examiner* — Jerry D Robbins

(57) ABSTRACT

A method of charging a battery in a vehicle, the method comprising: controlling, by a controller, battery charging from a power source external to the vehicle, charging the battery to a state of charge (SOC), wherein the SOC is based on: cost of electricity, source of electricity, battery health, battery temperature, electrical grid voltage, electrical grid frequency, and/or utility incentives. Generally, the vehicle charges more on good days so it can charge less on bad days, and charges less on bad days so it can charge more on good days.

20 Claims, 4 Drawing Sheets

USING ELECTRIC VEHICLES FOR LONG TERM ENERGY STORAGE

CROSS-REFERENCE TO RELATED APPLICATIONS

This application claims priority from and the benefit under 35 U.S.C. § 119(e) of U.S. Provisional Application No. 62/824,349 filed Mar. 27, 2019, the entire contents of which are incorporated herein by reference.

BACKGROUND OF THE INVENTION

Field of the Invention

The present invention generally relates to a method for charging a plug-in electric vehicle and, more particularly, to a method for charging a plug-in electric vehicle with an external power source.

Background

Electric vehicles (EVs) are powered by electricity stored in a rechargeable electrical storage device (eg. battery). Some electric vehicles may additionally be powered by gasoline, fuel cells, or natural gas, or other fuels stored on the vehicle. Some may be charged with energy from the electrical grid or with electrical energy from local electrical generation systems, including but not limited to, a solar photovoltaic (PV) system, or a generator. A plurality of electric vehicles contain large batteries that store a significant amount of energy.

Electric vehicles (EVs) are becoming increasingly popular and many nations are mandating their adoption. However it would increase electricity consumption by as much as 75%. This transition poses many challenges and opportunities.

The electrical grid requires balance. If the power is mismatched it may cause grid frequency to increase or decrease to values that are dangerous for some equipment. Electricity market prices may vary widely from hour to hour and day to day to reflect the cost of generation sources and the imbalance of supply and demand. Sometimes there is more power demand than power supply and it may cause prices to spike. Sometimes there is more power supply than power demand and it may cause prices to plummet, even becoming negative where utilities are willing to pay customers to consume electricity to maintain power balance for grid stability. The electrical grid also depends on transmission and distribution equipment to handle peak demands. When peak demands become too high for transmission or distribution equipment the voltages at the loads can drop to a value that is unsafe for some equipment, sometimes called a brownout. It can also cause electrical distribution equipment to fail causing a blackout. A lot of effort goes into keeping the electrical grid stable. It also results in services the utilities have to pay including ancillary services. Since some renewable sources of energy, like wind and solar, are intermittent they add variations to the supply side of the balance as well. And these sources of energy may increase in market share causing even more variability in the power balance on the grid and the electricity markets.

Controllable demand can be very valuable. EV smart charging offers a unique ability to control demand. In doing so, EV smart charging may provide valuable services to the grid, which may create a source of revenue for EV operators and/or manufacturers at little to no cost to the EV owner and/or operator and/or charge control aggregator. This revenue may make EVs more economical, leading to increased EV adoption.

One of the barriers to the adoption of EV smart charging is that the aggregation of EVs currently does not offer enough utility to make the effort economical to implement. One way to hasten and accelerate the smart charging implementation is to increase the utility of each vehicle.

Additionally there exists micro-grids and sections of larger grids where economics may favor using energy when it is being generated by a local electrical source. A common scenario is solar self consumption. Especially when solar photovoltaic PV owners are not equally compensated for excess energy. For that reason it is economically beneficial for the PV owner to use as much of their locally generated PV power and energy as possible and send as little as possible to the grid. This is sometimes called solar self-consumption. Demand meters are a similar situation.

Additionally, many electric vehicle owners and/or operators attempt to balance a plurality of parameters when selecting a target SOC for their electric vehicle. Selecting a SOC of 100% maximizes range, but it is generally understood that a target SOC around 50% maximizes battery life. The electric vehicle owner may not fully understand the considerations involved in picking a target SOC, or may not want to be burdened with determining the optimal target SOC.

BRIEF SUMMARY OF THE INVENTION

A vehicle includes a battery and battery charging equipment including a controller. The disclosed invention uses the charging equipment to charge the battery according to a target state of charge (SOC) determined by the cost of electricity, source of electricity, battery health, battery temperature, electrical grid voltage, electrical grid frequency, utility incentives, and/or other factors. The charging equipment may be further programmed with a lower SOC limit and an upper SOC limit defining a target SOC range from which to select a target SOC. And/or the charging equipment may be programmed with not less than 3 destrete target values from which to select the target SOC. And/or the charging equipment may be programmed with a target distribution from which to select a target SOC (eg normal distribution defined by a mean and a standard deviation, ect). The charging equipment may be further programmed to adjust the lower SOC limit and upper SOC limit per a schedule determined by user input and/or vehicle operation history.

In one embodiment, which is exemplary of a target SOC determined by a single static factor, a method for selecting a target SOC wherein the SOC is selected from all SOCs allowed by the vehicle operator and/or owner based on protecting the health of the vehicle battery (eg. selecting the SOC that is most stable for the battery chemistry).

In one embodiment, which is exemplary of a target SOC determined by a single dynamic binary factor, a method for charging an electric vehicle using locally generated energy from a solar photovoltaic PV system to a SOC that is not greater than the upper SOC limit and not less than the lower SOC by a target completion time. When conditions for charging are good (eg. the PV system is generating energy, or is generating excess energy) the charging equipment sets the target SOC to the upper SOC limit. When conditions for charging are not good the method controls charging to the lower SOC limit, waiting as long as possible to charge to the lower SOC limit by the target completion time.

In another embodiment, a method for creating and updating a target SOC based on multiple factors or a singular dynamic non-binary factor which may include, but is/are not limited to: cost of electricity, source of electricity, battery health, battery temperature, electrical grid voltage, electrical grid frequency, and/or utility incentives, wherein the target SOC is greater than or equal to the lower SOC limit and the target SOC is less than or equal to the upper SOC limit.

DETAILED DESCRIPTION OF THE INVENTION

Figure 1:
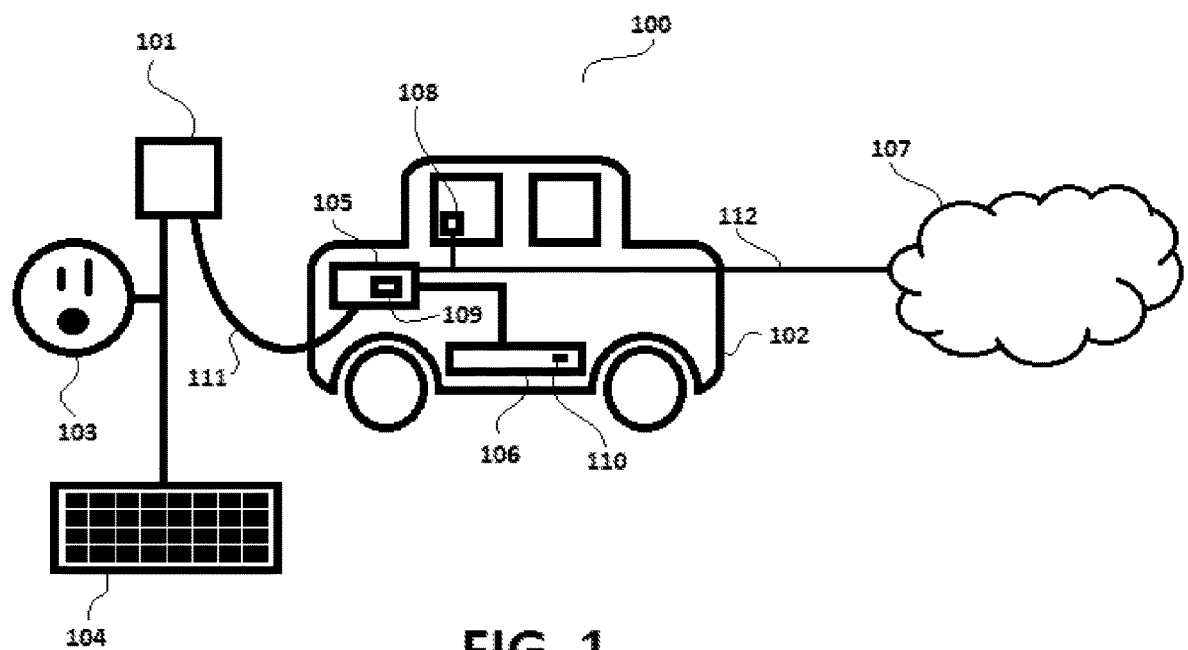
FIG. 1 is a high-level schematic view of an illustrative system for controlling charging of an electric vehicle according to an exemplary embodiment.

In an exemplary embodiment the system 100 may include electric vehicle supply equipment (EVSE) 101. The EVSE 101 may provide alternating current (AC) to the electric vehicle (EV) 102 through a cable 111. The EV 102 may contain charging equipment 105 that converts the AC to direct current (DC) to charge the EV 102 battery 106. The charging equipment 105 may include a controller 109 to control the charging of the EV 102 battery 106. The charging equipment 105 may charge the battery 106 based on information received from sensors 110 in the battery 106. The information may include battery 106 temperature and battery 106 voltage. The charging equipment 105 may also charge the battery 106 based on information received from the EVSE 101 communicated to the EV 102 through pulse width modulation (PWM) sent over a pilot line in the cable 111, or through power line communication (PLC), communicated through the power lines of the cable 111. The charging equipment 105 may measure the AC voltage, AC frequency, and/or read power line communication (PLC) from sources including but not limited to the EVSE 101 and the utility/electrical grid 103. The EVSE 101 may connect the EV 102 to the utility/electrical grid 103 and/or 1 or more local energy generation source 104 (eg. solar photovoltaics (PV)). The charging equipment 105 may communicate directly or indirectly via wire or wirelessly with a network 107 through a data connection 112. A network 107 may provide information to the charging equipment 105 such as the cost of electricity (eg. current market prices, hour ahead prices, day ahead prices, historical price data, demand metering, ect), source of electricity (eg. composition of sources providing energy to the grid 103, curtailment of renewable energy, forecasts thereof, ect.) electrical grid 103 voltage, electrical grid 103 frequency, and/or utility 103 incentives (eg. Time Of Use (TOU) rates, demand response, ancillary services, or incentives based on grid 103 voltage, grid 103 frequency, transformer temperature, power losses, power ramp up and ramp down rates, Critical Excess of Electrical Power (CEEP), ect.). The EV 102 may have a Human Machine Interface (HMI) 108. The HMI 108 may allow EV 102 owners/operators to set values or input information for the charging equipment 105 through a data connection 112. Users may also be able to set values or input information through the network 107.

The above description is not meant to exclude any variation of the above embodiment. For example, variations of the above described embodiment exist where the EV 102 is charged wirelessly, and/or or communicates with the EVSE 101 wirelessly, and/or charging equipment 105 is external to the EV 102 (eg. L3 charging), or the battery 106 is removable and may be charged external to the EV 102, or the charge equipment 105 controller 109 is external to the EV 102, or the method is performed by a controller 109 external to the EV 102 and are communicated to the charge equipment 105, or controlled via the EVSE 101. There exist many variations to the above which make no contribution to the claimed invention. The most exemplary scenarios are disclosed. The invention claimed is not meant to be limited to these most exemplary scenarios. The claimed invention is not intended to be used only for cases described herein.

A battery's 106 full usable range may be defined differently by the battery 106 manufacturer and the EV 102 manufacturer. What the EV 102 manufacturer considers 0% SOC may be greater than what the battery 106 manufacturer considers 0% SOC, and what the EV 102 manufacturer considers 100% SOC may be less than what the battery 106 manufacturer considers 100% SOC. These values may be derived from measurements of the battery 106 voltage and known battery 106 SOC/voltage relationships. These values may also be derived from records of electrical current going into and coming from the battery 106 known as amp-hour integration. Further, the SOC may be communicated in terms of how far the EV 102 could travel or how much time the EV 102 could be operated. Methods for determining the SOC of an EV 102 are numerous and well documented. The descriptions herein are not to limit the invention to a particular definition or method for measuring, quantifying, or communication a SOC of the battery 106. Specific methods discussed are to be exemplary but are not exhaustive and may not be seen as limiting. This description may be read as a framework to be applied to any method for measuring, quantifying, or communicating a SOC of a battery 106. Herein, to aid in understanding through consistency, it will be communicated as a percent as determined by the EV 102 manufacturer.

Figure 2:
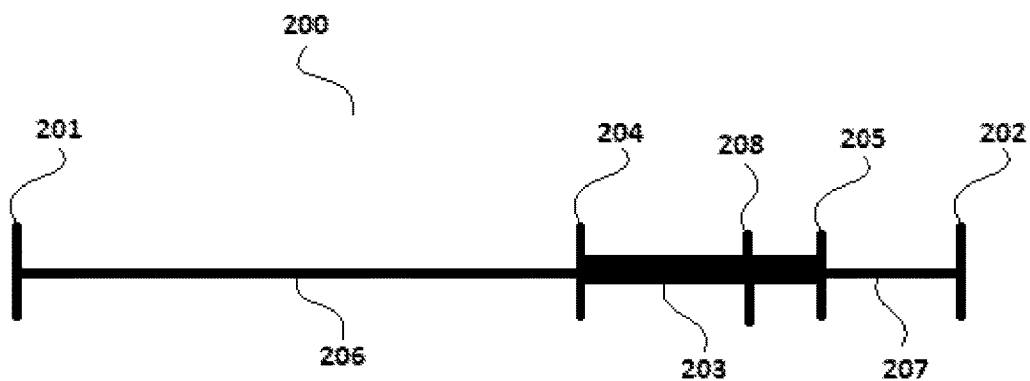
FIG. 2 is a depiction of the range of values created by an upper SOC limit and lower SOC limit during a specific time. The values depicted as the upper SOC limit and lower SOC limit may not be seen as limiting the possible options for upper SOC limit and lower SOC limit.

In an embodiment a range of possible charge values exists between 0% SOC 201 and 100% SOC 202. A target range 203 may be defined as the range of possible values greater than a lower SOC limit 204 and less than or equal to an upper SOC limit 205. The target range 203 is a set of all SOC values which the EV 102 operator and/or owner would find acceptable at a given time. The target range 203 can change on a temporal basis. For example, the range may be different on weekends and weekdays. It also may be different from hour to hour. The target range 203 is a set of SOC values that is a subset of all possible SOC values. It does not necessarily need to be a continuous range. The target range 203 may be a set of discrete values, or it may be a continuous range of values, or it may be a distribution of values (eg. gaussian). In the simple embodiment depicted in FIG. 2 the range of values which are smaller 206 than the lower SOC limit 204 may be unacceptable for providing too little range at the given time. The range of values that is smaller 206 than the lower SOC limit 204 may also represent SOCs where the battery 106 degrades at an accelerated rate. It is also possible that there are no values between the lower SOC limit 204 and 0% SOC 201 when the lower SOC limit 204 is equal to 0% SOC 201. Similarly, in the simple embodiment depicted in FIG. 2 the range of values which are larger 207 than the upper SOC limit 205 may be unacceptable by the EV 102 operator/owner for causing battery 106 degradation at an accelerated rate. It is also possible that there are no values between the upper SOC limit 205 and 100% SOC 202 when the upper SOC limit 205 is equal to 100% SOC 202. FIG. 2 may also represent the HMI screen with which the EV 102 operator/owner may input SOC limits.

In one embodiment the EV 102 owner and/or operator may select a lower SOC limit 204 and an upper SOC limit 205 defining a target range 203. The EV 102 may select a target SOC from this target range 203 based on preserving the health of the battery 106. A simple implementation may set the target as close to the value the battery 106 manufacturer determines as the most stable SOC. A more sophisticated embodiment may document the typical depth of discharge utilized by the EV 102 and set the target SOC in an attempt to keep the discharge/charge cycle range as close to the range which the EV 102 manufacturer determines the least taxing on the battery 106. Another embodiment still may increase the target SOC if the EV 102 spends significant amounts of time at low SOCs which can also accelerate battery 106 degradation.

Figure 3:
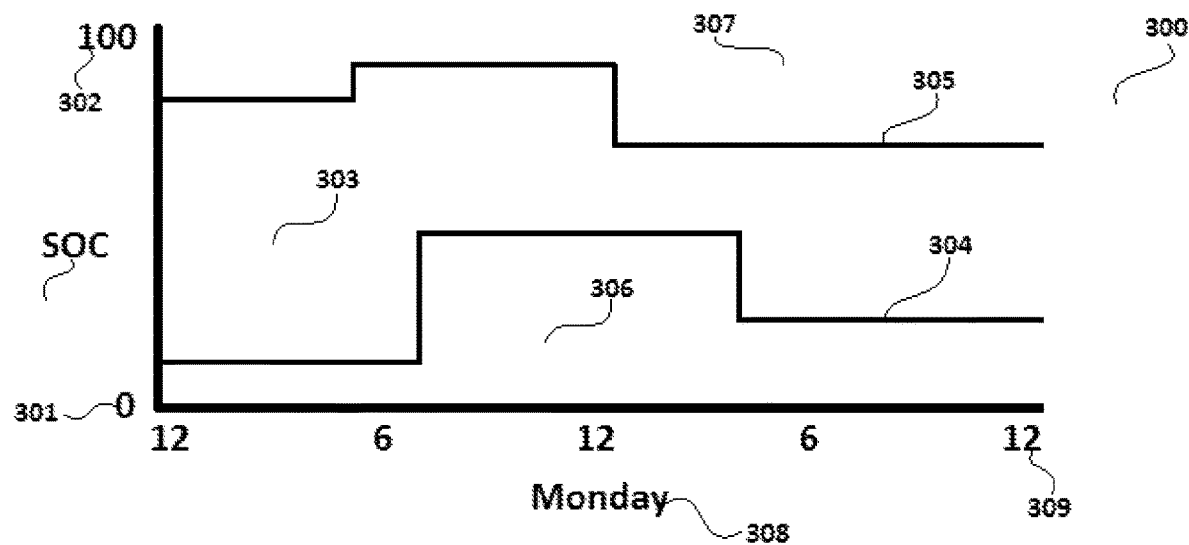
FIG. 3 is a depiction of the range of values created by an upper SOC limit and lower SOC limit schedule. The values depicted as the upper SOC limit and lower SOC limit may not be seen as limiting the possible options for upper SOC limit and lower SOC limit.

FIG. 3 shows another embodiment where the upper SOC limit 305 and lower SOC limit 304 are continuous instead of temporally discrete values. The schedule 300 shows a range of possible charge values between 0% SOC 301 and 100% SOC 302. A target range 303 may be defined as the range of possible values greater than or equal to a lower SOC limit 304 and less than or equal to an upper SOC limit 305. The target range 303 is a set of all SOC values which the EV 102 operator and/or owner may find acceptable at a given time. The subset can change on a temporal basis. For example, the range may be different on different days of the week 308. It also may be different from hour to hour 309. The target range 303 is a set of SOC values that is a subset of all possible SOC values. It does not necessarily need to be a continuous range. The target range 303 may be a set of discrete values, or it may be a continuous range of values, or it may be a distribution of values (eg. gaussian). In the simple embodiment depicted in FIG. 3 the range of values which are smaller 306 than the lower SOC limit 304 may be unacceptable for providing too little range at the given time. The range of values that is smaller 306 than the lower SOC limit 304 may also represent SOCs where the battery 106 degrades at an accelerated rate. It is also possible that there are no values between the lower SOC limit and 0% SOC 301 when the lower SOC limit 304 is equal to 0% SOC 301. Similarly, in the simple embodiment depicted in FIG. 3 the range of values which are larger 307 than the upper SOC limit 305 may be unacceptable for causing battery 106 degradation at an accelerated rate. It is also possible that there are no values between the upper SOC limit 305 and 100% SOC 302 when the upper SOC limit 305 is equal to 100% SOC 302. FIG. 3 may also represent the HMI screen with which the EV 102 operator/owner may input SOC limits.

In one embodiment the EV 102 owner and/or operator may select a lower SOC limit 304 and an upper SOC limit 305 defining a target range 303. The charging equipment 105 may select a target SOC from this target range 303 based on preserving the health of the battery 106. A simple implementation may set the target as close as allowable to the value the battery 106 manufacturer determines as the most stable SOC. A more sophisticated embodiment may document the typical depth of discharge utilized by the EV 102 and set the target SOC 303 in an attempt to keep the discharge/charge cycle range as close to the range which the EV 102 manufacturer determines is the least taxing on the battery 106. Another embodiment still may increase the target SOC if the EV 102 spends significant amounts of time at low SOCs which can also accelerate battery 106 degradation.

In one embodiment, if the EV 102 were to be plugged in while the SOC was in the range of values which are smaller 306 than the lower SOC limit 304 for the time it was currently occupying, the EV 102 may charge immediately to the lower SOC limit 304 for the time it was currently occupying. When the SOC reaches the lower SOC limit 304 the EV 102 may then begin smart charging.

In one embodiment a target range 203 may be used to maximize local energy generation source 104 self-consumption. This method is exemplary of using a target range 203 to maximize a dynamic binary parameter. With local energy generation source 104 self consumption the parameters to charge can change between good or not good. 1 or 0. Binary. A good time to charge may be defined as a time when the local energy generation source 104 is generating power, or it may be defined as a time when the local energy generation source 104 is generating excess power. When the EV 102 is connected to the EVSE 101 the EV 102 determines the latest time at which the EV 102 will need to begin charging in order to reach the lower SOC limit 204 by the target completion time. This will be based on the current SOC, the lower SOC limit 204, the target completion time, and the smaller of the the EVSE 101 power capacity and the charge equipment 105 capacity. Whenever this time is reached the EV 102 will charge to the lower SOC limit 204 at the maximum charge rate until the lower SOC limit 204 is reached. Until that time the EV 102 charge rate is determined by the rate of local energy generation source 104 production, up until the SOC reaches the upper SOC limit 205.

Figure 4:
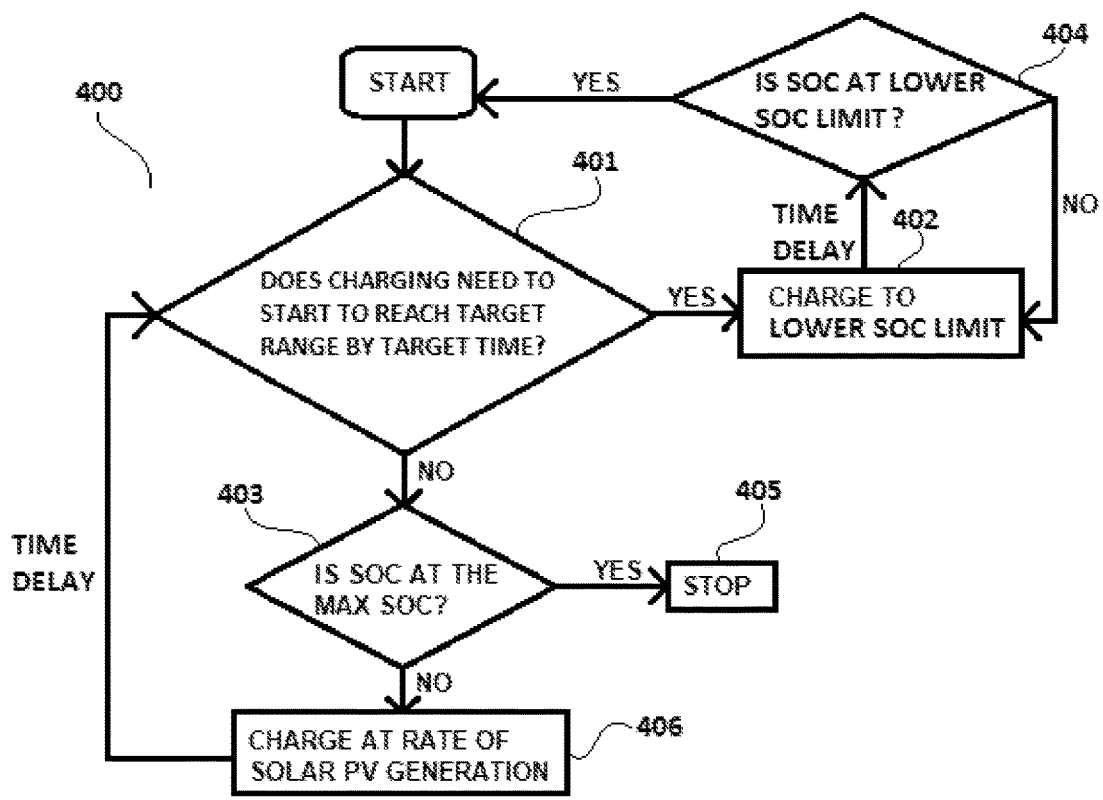
FIG. 4 is a process flow diagram of an illustrative method for controlling the charging of an electric vehicle based on a dynamic binary factor (eg. solar self-consumption) and to ensure the final SOC is within the target range.

FIG. 4 depicts this situation as an exemplary method. The process 400 may begin in block 401 where the process may determine if charging needs to start to reach lower bounds of the target range 203 by the target completion time. If yes then the process may charge the EV 102 to the lower SOC limit 204 in block 402. Charging to the lower SOC limit 204 in block 402 may require using energy from the electrical grid 103, or energy from a microgrid 103 that does not fit the definition of good. For example, it may require using energy from a generator or a storage battery 106. When the SOC reaches the lower SOC limit 204 block 404 may start the process again from the start. If block 401 determines charging does not yet need to start to reach the lower SOC limit 204 by the target completion time then the method checks to see if the SOC is already at the upper SOC limit 205 in block 403. If determined that the current SOC is at the upper SOC limit 205 block 405 may stop charging and stop the process. If the SOC is not at the upper SOC limit 205 the process may charge the EV 102 in block 406. The process 400 may begin again at block 401 to be sure it stops charging the EV 102 once the upper SOC limit 205 has been reached. In this example block 406 charges the EV 102 at a rate equal to local energy generation source 104 generation. So the definition of when conditions for charging are good would simply be when the local energy generation source 104 is generating energy. This may also be at a rate equal to the excess energy being generated, or it may be charged at the maximum rate permitted by charging equipment 105 and the EVSE 101, and may include a time delay to prevent relays in the system from cycling too often. When the EV 102 is at the upper SOC limit 205 charging may stop. The actual SOC may not reach the upper SOC limit 205 before conditions turn from good to bad, and before the target completion time. Reaching the upper SOC limit 205 is not required. If the SOC reaches the upper SOC limit charging may be ended even when conditions for charging are good to prevent the SOC from exceeding the target range 203. The actual SOC may exceed the lower SOC limit 204 when conditions for charging change from good to bad. It is acceptable for the SOC to remain in the target range 203.

Figure 5:
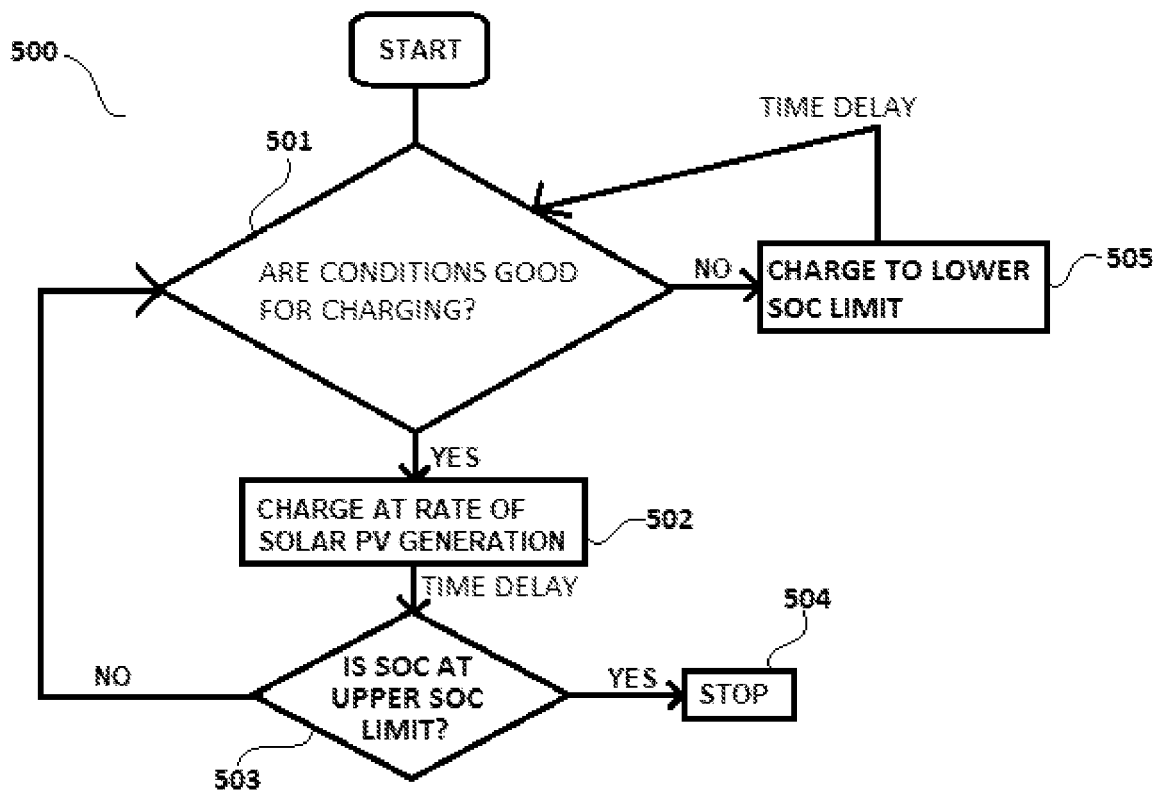
FIG. 5 is another process flow diagram of an illustrative method for controlling the charging of an electric vehicle based on a dynamic binary factor (eg. solar self-consumption) and to ensure the final SOC is within the target range.

FIG. 5 depicts this situation using an alternative process 500. The process 500 determines if conditions are good for charging in block 501. If conditions for charging are good the process may charge the EV 102 to the upper SOC limit 205 in block 502. Again, this example charges at a rate equal to the local energy generation source 104 generation. This may also be at a rate equal to the excess local energy generation source 104 power being generated, or it may be charged at the maximum rate permitted by charging equipment 105 and the EVSE 101, and may include a time delay to prevent relays in the system from cycling too often. The process checks to see if the SOC has reached the upper SOC limit 205 in block 503. If it has reached the upper SOC limit 205 then block 504 stops the charging and stops the process. If the SOC has not reached the upper SOC limit 205 in block 503 then the process goes back to block 501. If the conditions for charging are not good the process 500 may charge the EV 102 to the lower SOC limit 204 in block 505. The actual SOC may not reach the upper SOC limit 205 before conditions turn from good to not good, and before the target completion time. Reaching the upper SOC limit 205 is not required. If the SOC reaches the upper SOC limit charging may be ended even when conditions for charging are good to prevent the SOC from exceeding the target range 203. The actual SOC may exceed the lower SOC limit 204 when conditions for charging change from good to not good. It is acceptable for the SOC to end anywhere in the target range 203 per the schedule.

Other dynamic binary factors include but are not limited to TOU rates, times of energy curtailment (eg renewable energy curtailment), times the EV 102 spends at free or cheaper charging locations (eg charging at work), use with demand meters, or use with non binary parameters by using thresholds.

There also exists scenarios using bidirectional chargers or EV 102 with bidirectional charging equipment 105 where the EV 102 may charge and discharge at a rate equal to the local energy generation source 104 surplus or net energy deficit wherein the SOC must remain with the target range 203, or must not reach a SOC that makes it impossible to reach the target range 203 by the target completion time.

In another embodiment, a target SOC for the EV 102 is determined based on factors including, but not limited to: cost of electricity, source of electricity, battery 106 health, battery 106 temperature, electrical grid 103 voltage, electrical grid 103 frequency, and/or utility 103 incentives, wherein the target SOC is greater than or equal to the lower SOC limit 204 and is less than or equal to the upper SOC limit 205. If conditions are favorable for charging than the target SOC may be close to or equal to the upper SOC limit 205. When conditions are not favorable for charging than the target SOC may be close to or equal to the lower SOC limit 204. A possible method for determining the target SOC based on multiple factors is to combine their influence as a weighted average. Another method is to use fuzzy logic to determine and combine the effects of multiple factors.

Figure 6:
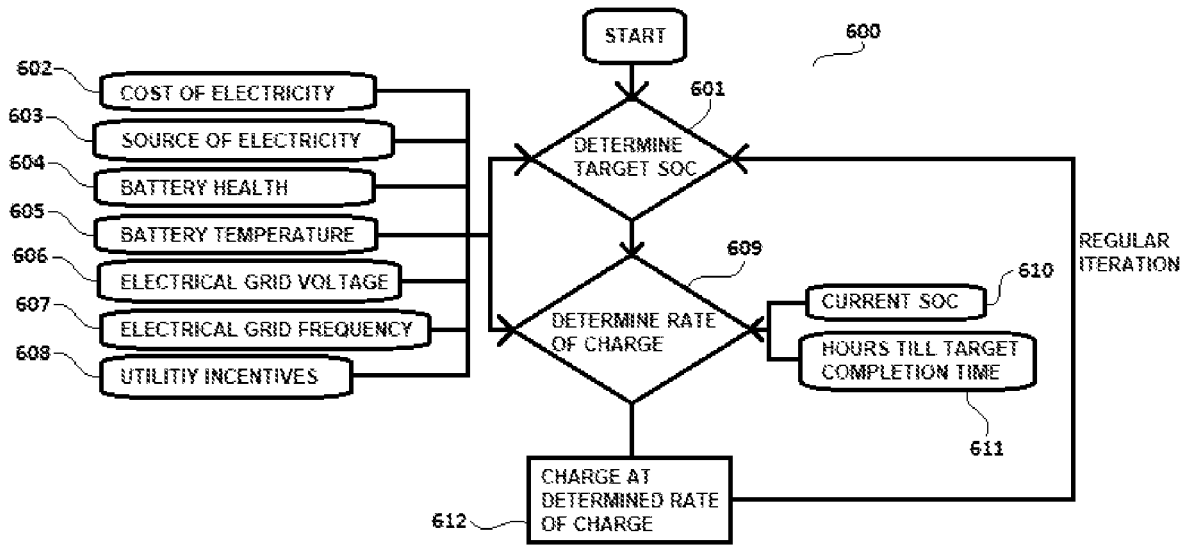
FIG. 6 is a process flow diagram of an illustrative method for controlling the charging of an electric vehicle based on multiple factors and/or a non-binary factor by establishing and updating a target SOC value within the target range.

One embodiment exemplified by the process 600 in FIG. 6 may determine the target SOC at block 601. Determining the target SOC may involve evaluating and combining several factors. Those factors may include the cost of electricity 602, source of electricity 603, battery 106 health 604, battery 106 temperature 605, electrical grid 103 voltage 606, electrical grid 103 frequency 607, and utility 103 incentives 608. For example, when the cost of electricity 602 is high the target SOC may be set lower, when the cost of electricity 602 is low the target SOC may be set higher, when the forecasted cost of electricity 602 is lower than the current cost of electricity 602 the target SOC may be set lower, when the forecasted cost of electricity 602 is higher than the current cost of electricity 602 the target SOC may be set higher, when the source of electricity 602 is low in renewable energy the target SOC may be set lower, when the source of electricity 602 is high in renewable energy the target SOC may be set higher, when the SOC is low enough to be harmful to the battery 106 health 604 the target SOC may be set higher, when the SOC is high enough to be harmful to the battery 106 health 604 the target may be set lower, when the battery 106 temperature 605 is low the target SOC may be set higher, when the battery 106 temperature 605 is high the target SOC may be set lower, when the electrical grid 103 voltage 606 is low the target SOC may be set lower, when the electrical grid 103 voltage 606 is high the target SOC may be set higher, when the electrical grid 103 frequency 607 is high the target SOC may be set higher, when the electrical grid 103 frequency 607 is low the target SOC may be set lower, when the utility 103 incentives 608 are high the target SOC may respond accordingly (if demand curtailment than target SOC may be set lower. If CEEP the target SOC may be set higher, if ancillary services than it could vary, ect.). The factors can be independently evaluated and then combined using a number of methods. The exemplary method is to use fuzzy logic to independently evaluate each method and combine them using methods common in fuzzy logic. This can also be done using smart systems, algorithms, weighted averaging, ect.

When block 601 determines the target SOC block 609 may determine the charge rate. There are numerous methods for determining the charge rate. The charge rate may either be binary (charge at the lesser of the capacity of the EVSE 101, the charging equipment 105, or the battery 106 or don't charge at all). The method described may not be understood as the only method. Since the step of determining the charge rate comes after the step of determining a target SOC the step of determining a target SOC is agnostic to the method used to determine the charge rate. It may be beneficial to use some or all of the same information used to determine the target SOC to determine the charge rate in block 609, and vice versa. This exemplary method determines the average charge rate needed by calculated the difference of the target SOC from block 601 and the current SOC 610 and dividing that quantity of energy by the hours left till target completion time 611. Once the average charge rate needed to reach the target SOC by the target completion time is calculated this exemplary process 600 modifies that charge rate value using the same information that was used to calculate the target SOC using the same general relationships as discussed for the target SOC. For example, when the cost of electricity 602 is high the charge rate may be set lower, when the cost of electricity 602 is low the charge rate may be set higher, when the source of electricity 602 is low in renewable energy the charge rate may be set lower, when the forecasted cost of electricity 602 is lower than the current cost of electricity 602 the charge rate may be set lower, when the forecasted cost of electricity 602 is higher than the current cost of electricity 602 the charge rate may be set higher, when the source of electricity 602 is high in renewable energy the charge rate may be set higher, when the SOC is low enough to be harmful to the battery 106 health 604 the charge rate may be set higher, when the SOC is high enough to be harmful to the battery 106 health 604 the charge rate may be set lower, when the battery 106 temperature 605 is low the charge rate may be set higher, when the battery 106 temperature 605 is high the charge rate may be set lower, when the electrical grid 103 voltage 606 is low the charge rate may be set lower, when the electrical grid 103 voltage 606 is high the charge rate may be set higher, when the electrical grid 103 frequency 607 is high the charge rate may be set higher, when the electrical grid 103 frequency 607 is low the charge rate may be set lower, when the utility 103 incentives 608 are high the charge rate may respond accordingly (if demand curtailment than charge rate may be set lower. If CEEP the charge rate may be set high, if ancillary services than it could vary, ect.). The factors can be independently evaluated and then combined using a number of methods. The exemplary method is to use fuzzy logic to independently evaluate each method and combine them using methods common in fuzzy logic. This can also be done using smart systems, algorithms, weighted averaging, ect. If the average rate needed to reach the target SOC in time is high there may be little time left to wait for better charging conditions, and so when the average rate needed to reach the target SOC is high block 609 may not be permit the additional factors to slow down the charge rate. The fuzzy engine may be given a rule that modifies the charge rate to charge at the average calculated rate when the average calculated rate is high to ensure the EV 102 reaches the target SOC by the target completion time. Block 612 then charges the EV 102 at the rate determined by block 609 for a predetermined amount of time and/or until the factors change. At which time the process 600 goes back to block 601. Fuzzy logic could be used to pick from a range, or a distribution (eg. gaussian distribution), or pick from 3 or more discrete values based on whichever is closest to the optimal value. Or the system could evaluate all of the discrete values and select the most optimal.

The above exemplary processes and methods could be performed locally at the EV 102 based on providing the charging equipment 105 with the necessary information. The processes and methods could also be performed remotely by a so called 'aggregator', who may be the vehicle manufacturer; the utilities, the EVSE 101 owner, EVSE 101 manufacturer; a third party, ect. Performing the method remotely via a data connection 112 through the network 107 may be performed in a similar way to what is shown above, charging all possible vehicles to a target SOC that is less than their upper SOC limit 205 and is greater than their lower SOC limit 204, the target determined by the significance of the factors. Performing the method remotely may save data by charging vehicles to the extremes of their limits, either setting the target SOC of select cars to their upper SOC limit 205 or setting the SOC of select cars to their lower SOC limit 204, the number of cars set to the extreme of their limit determined by the significance of the factors.

Figure 7:
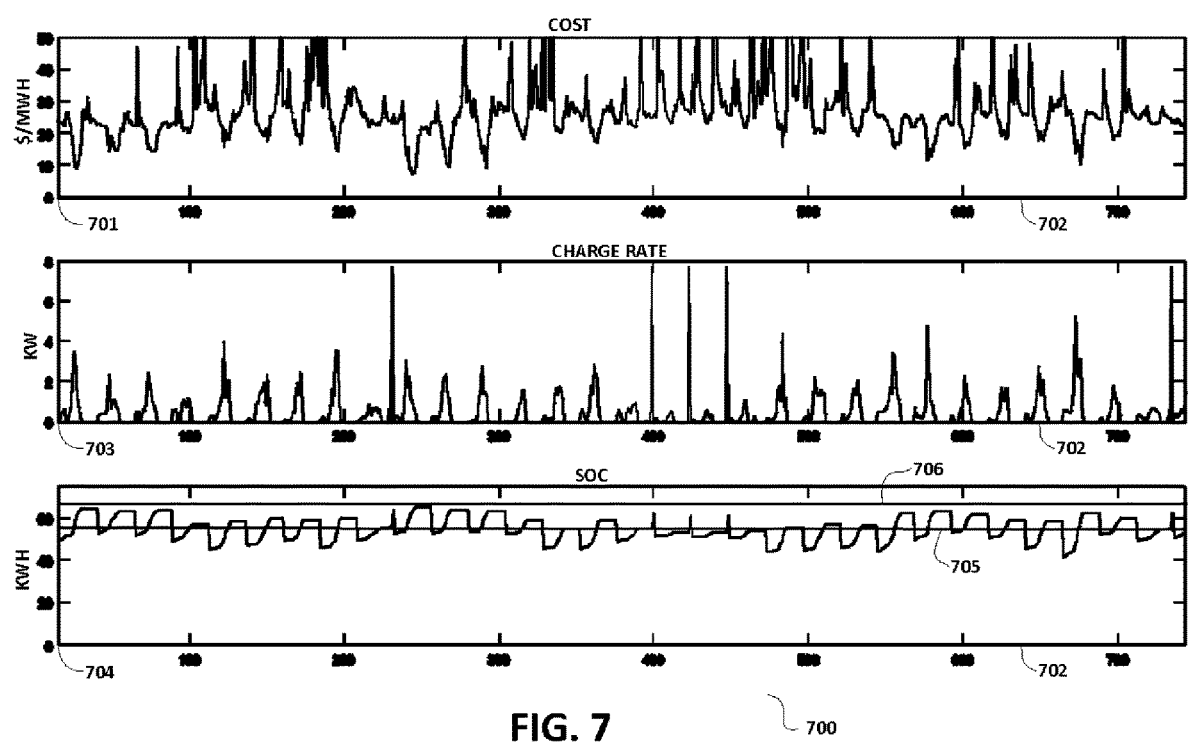
FIG. 7 is an exemplary graph of the variation in target SOC created by the process in FIG. 6.

Turn attention to FIG. 7 for an exemplary graph of results 700 from process 600 shown in FIG. 6. In this chart only the cost of electricity 602 is used to determine the target SOC to make it simpler to follow. The charge rate is determined in part by the cost of electricity 602, and in part by the current SOC as to protect the health of the battery 106. As discussed later that may not be important for some EV 102 operators. The top chart 701 shows the cost of electricity 602 graphed for 1 month, broken down into hours on the x axis 702. The top chart 701 shows the significant variation in cost of electricity 602 from hour to hour. There are times when the cost is off of the chart 701. The top chart 701 makes it clear there can be significant variation from day to day. It is clear that there are days that are better for charging than other days, and this chart is from a grid that does not yet have a significant amount of renewable energy. The middle chart 703 shows the charge rate, wherein the top of the chart is the maximum charge rate the charging equipment 105 is capable of. The bottom chart 704 shows the SOC and is communicated in energy (KWH). The chart shows the completion SOC varies within a lower SOC limit 705 and an upper SOC limit 706.

EV 102 operator preferences suggests for a car with a range of 310 miles the average lower SOC limit 204 would be set by the operator to 72% (216 miles), and the upper SOC limit 205 would be set by the operator to 90% (269 miles). For a car with a range of 220 miles the average lower SOC limit 204 would be set by the operator to 77% (169 miles), and the upper SOC limit 205 would be set by the operator to 90% (198 miles). This shows a trend where larger batteries generally may afford a larger SOC range.

It is common for EV 102 owners to want the SOC to stay well below 100% 202 to protect the health of their battery. For this reason many rarely ever wanted their vehicle to charge to 100% 202. EV 102 operators who do not own their EV 102 (eg lessees) may have no concerns for battery health. Such operators may not mind charging to 100% 202.

Improving uptake of smart charging may be important. Uptake may be improved through manual target SOC overrides, or manual smart charging overrides, or temporary SOC limit overrides. The disclosed invention does not intend to exclude manual override methods.

Calculating time needed to reach the lower SOC limit, or calculating the average rate of charge needed to reach the target SOC by the target completion time, or other methods of smart charging may benefit from additional steps used to attempt to account for time the EV 102 will be unplugged. The disclosed invention does not intend to exclude methods for accounting for time the EV 102 spends unplugged.

I claim:

1. A method for shifting charging demand of an electric vehicle from days with unfavorable charging conditions to days with favorable charging conditions, the method comprising:
attaining a target SOC range for the electric vehicle, wherein the target SOC range consists of target SOCs that are acceptable to a user of the electric vehicle;
attaining a target charge completion time;
selecting a target SOC from the target SOC range wherein a high target SOC is selected when charging conditions are favorable and a low target SOC is selected when charging conditions are unfavorable; and controlling charging of the electric vehicle to reach the target SOC by the target charge completion time.

2. The method of claim 1, wherein the target SOC range consists of not less than 3 target SOCs that are acceptable to a user of the electric vehicle.

3. The method of claim 2, wherein the target SOC range includes all possible target SOCs greater than or equal to a lower SOC limit defined by the user.

4. The method of claim 3, wherein the target SOC range then excludes all possible target SOCs greater than an upper SOC limit defined by the user.

5. The method of claim 4, wherein the selection of the target SOC from the target SOC range is reevaluated when charging conditions change.

6. The method of claim 5, wherein the charging conditions are favorable when electricity prices are low and the charging conditions are unfavorable when electricity prices are high.

7. The method of claim 4, wherein different target SOC ranges are set at different times on a schedule.

8. The method of claim 7, wherein the charging conditions are favorable when renewable electricity is abundant and the charging conditions are unfavorable when renewable electricity is not abundant.

9. The method of claim 2, wherein the target SOC range consists of a distribution of target SOC values defined by a probabilistic function.

10. A system for shifting charging demand of an electric vehicle from days with unfavorable charging conditions to days with favorable charging conditions, the system comprising:
   the electric vehicle;
   battery charging equipment; and
   a controller to control charging of the electric vehicle, the controller being configured to:
      attain a target SOC range for the electric vehicle, the target SOC range consisting of target SOCs that are acceptable to a user of the electric vehicle;
      attain a target charge completion time at which time the vehicle must be charged to a target SOC from the target SOC range; and
      select a target SOC from the target SOC range wherein a high target SOC is selected when charging conditions are favorable and a low target SOC is selected when charging conditions are unfavorable;
      control charging of the electric vehicle to reach the target SOC by the target charge completion time.

11. The system of claim 10, wherein the target SOC range consists of not less than 3 target SOCs that are acceptable to a user of the electric vehicle.

12. The system of claim 11, wherein the target SOC range includes all possible target SOCs greater than or equal to a lower SOC limit defined by the user.

13. The system of claim 12, wherein the target SOC range then excludes all possible target SOCs greater than an upper SOC limit defined by the user.

14. The system of claim 13, wherein the selection of the target SOC from the target SOC range is reevaluated when charging conditions change.

15. The system of claim 13, wherein different target SOC ranges are set at different times on a schedule.

16. The system of claim 15, wherein the charging conditions are favorable when electricity prices are low and the charging conditions are unfavorable when electricity prices are high.

17. The system of claim 15, wherein the charging conditions are favorable when renewable electricity is abundant and the charging conditions are unfavorable when renewable electricity is not abundant.

18. The system of claim 11, wherein the target SOC range consists of a distribution of target SOC values defined by a probabilistic function.

19. A method for using an electric vehicle for long term energy storage, the method comprising:
   attaining a target SOC range, wherein the target SOC range consists entirely of user acceptable target SOCs;
   attaining a target charge completion time at which time the vehicle must be charged to a target SOC from the target SOC range;
   selecting a target SOC from the target SOC range wherein a high target SOC is selected when charging conditions are favorable and a low target SOC is selected when charging conditions are unfavorable; and
   controlling charging of the electric vehicle to the target SOC by the target completion time.

20. The method of claim 19, wherein the target SOC range consists of not less than 3 target SOCs that are acceptable to a user of the electric vehicle.

* * * * *